Aug. 30, 1927.

K. DICKOW 1,640,649

WATERING APPARATUS FOR CATTLE

Filed May 4, 1925   2 Sheets-Sheet 1

Inventor:
Karl Dickow
by Franz Reinhart
Attorney.

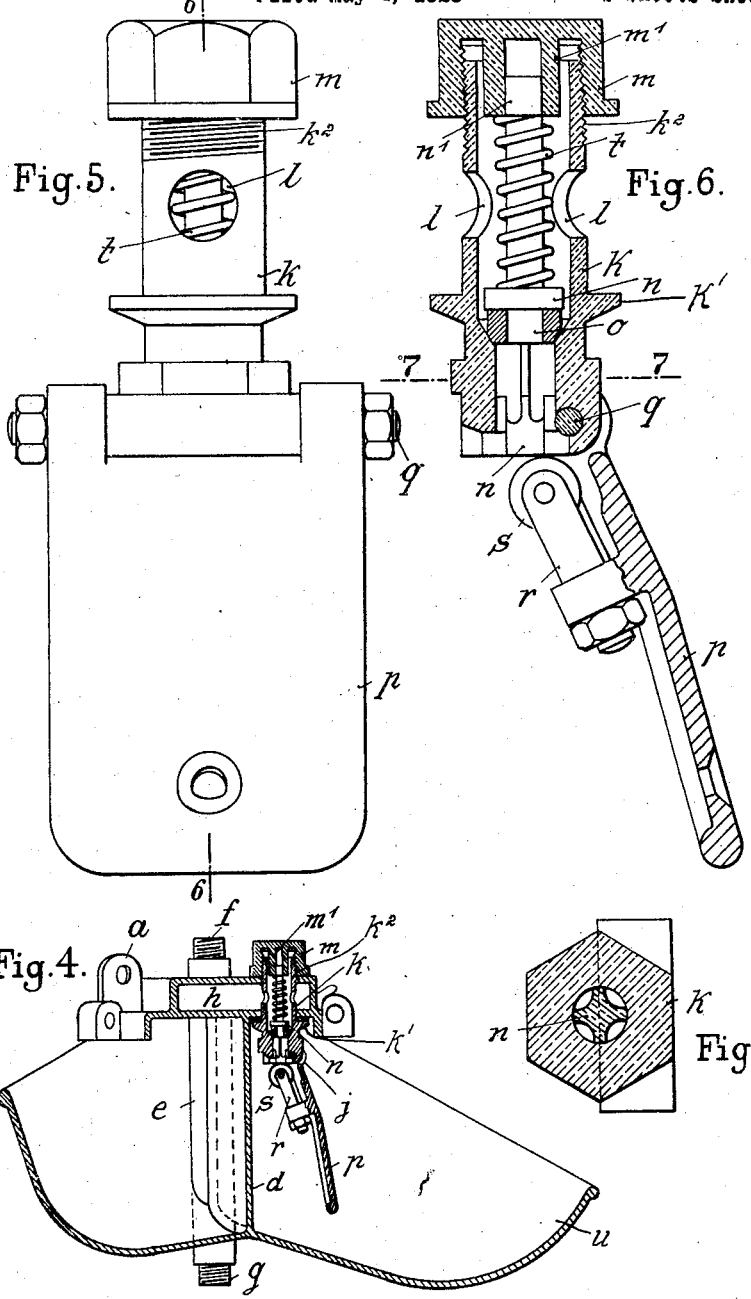

Patented Aug. 30, 1927.

1,640,649

UNITED STATES PATENT OFFICE.

KARL DICKOW, OF GORLITZ, GERMANY.

WATERING APPARATUS FOR CATTLE.

Application filed May 4, 1925, Serial No. 27,950, and in Germany May 23, 1924.

My invention relates to improvements in watering apparatus for cattle, and more particularly in watering apparatus which are provided with a valve adapted to be operated by the cattle for admitting water to to watering trough. One of the objects of the improvements is to provide an apparatus in which the valve can be safely and easily operated by the cattle. Another object is to construct the valve so that it can be readily removed for cleaning the water supply. Finally an object of the improvements is to construct the valve casing so that impurities of the water are not admitted thereto. With these objects in view my invention consists in providing a tubular valve casing extending through the conduit supplying the water to the trough and removably secured to opposite walls of the said conduit, the said conduit being provided at a part away from the bottom of the conduit with openings for the flow of the water from the casing to the conduit. Further, a member adapted to be operated by the cattle for opening the valve is mounted on the said valve casing, so that it can be removed together with the said casing.

Figure 1:
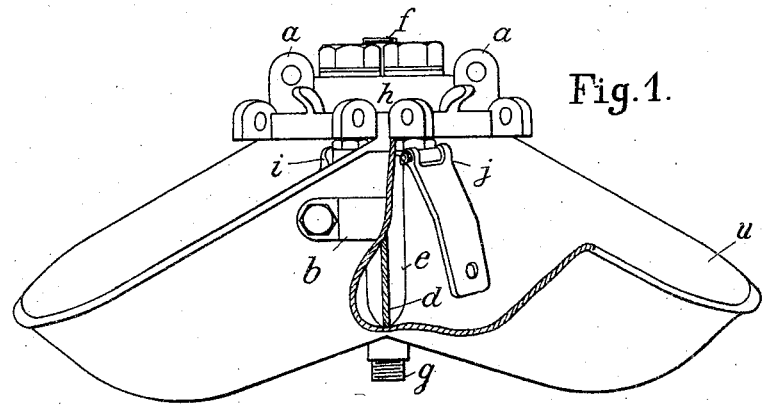
Figure 2:
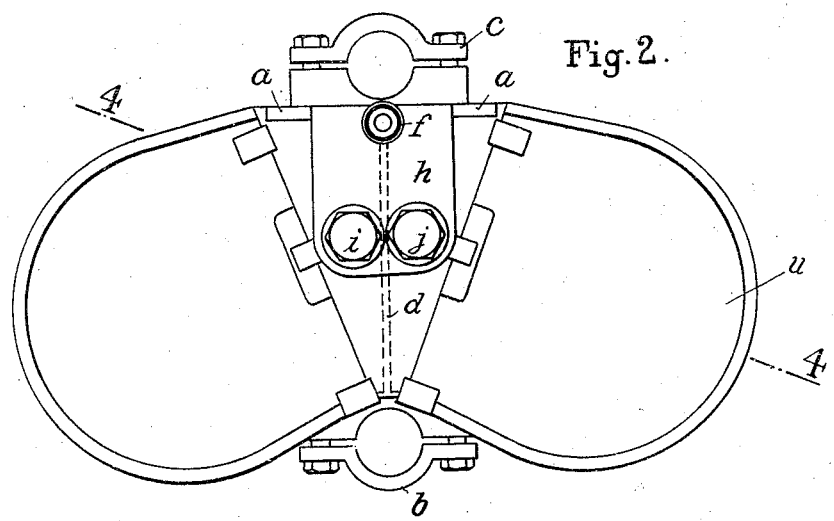
Figure 3:
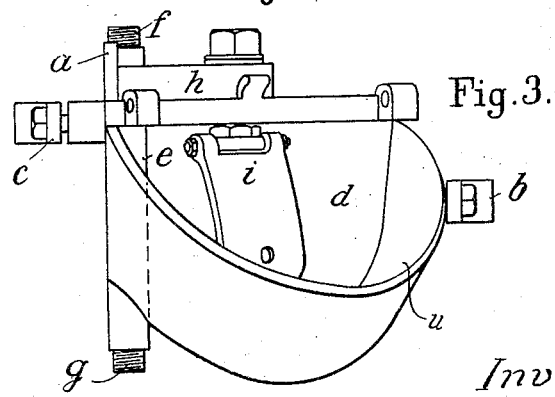

For the purpose of explaining the invention an example embodying the same has been shown in the accompanying drawings, in which the same reference characters have been used in all the views to indicate corresponding parts. In said drawings, Fig. 1, is an elevation of the apparatus with a part of the wall of one of the troughs broken away to show the plate operating the valve, Fig. 2, is a top plan view of Fig. 1, Fig. 3. is an elevation looking from the left in Fig. 1, Fig. 4, is a sectional elevation taken on the line 4—4 of Fig. 2, Fig. 5, is a detail view in elevation showing the valve casing and the operating plate mounted thereon on an enlarged scale, Fig. 6, is a sectional elevation taken on the line 6—6 of Fig. 5, and Fig. 7, is a horizontal section taken on the line 7—7 of Fig. 6.

In the example shown in the drawings the watering apparatus comprises two troughs $u$ separated from each other by a partition $d$. At the rear of the troughs and made integral therewith there is a vertical tubular member $e$ provided at its top and bottom ends with screw-threads $f$ and $g$ for connecting the same to the water supply pipe, said pipe being connected either to the top or bottom of the tubular member, and the other end being closed by a cap screw or the like. The tubular member $e$ is in communication with an enlarged conduit $h$ made integral with the trough, which conduit is preferably in the form of a flat box. The said box $h$ is adapted to receive two valve casings $i$ and $j$ for supplying water to the troughs. The troughs are further provided with clamping means $c$ for securing the same to a suitable support such as a column.

As appears more particularly from Figs. 4 to 7 the valve consists of a tubular valve casing $k$ formed near its bottom with a flange $k^1$ and having screw-threads $k^2$ at its top. The casing is passed through suitable holes made in the top and bottom walls of the box $h$, the flange bearing through the intermediary of a packing ring on the bottom wall of the said box, and a cap screw $m$ being screwed to the screw-threaded portion $k^2$ and bearing on the top wall of the box $h$ through the intermediary of a packing ring. Thus the casing is clamped in position by means of the cap screw $m$. At a part away from the bottom of the box $h$ the wall of the casing $k$ is provided with two holes $l$ through which the water from the conduit has access to the valve casing. Within the valve casing a valve cone $n$ is located, which is provided with a packing ring $o$ of rubber. The stem $n^1$ of the valve cone is guided at its top end in an axial sleeve $m^1$ made integral with the cap screw $m$. Normally the valve is forced on its seat by a spring $t$ bearing with its top end on the bottom end of the sleeve $m^1$ and with its bottom end on the top face of the cone $n$. When screwing down the cap screw $m$ the spring $t$ is put under tension. On a transverse pivot bolt $q$ fixed to the bottom part of the valve casing a plate $p$ is rockingly mounted, which plate is disposed within the trough $u$ and in position for being moved by the mouth of the cattle for opening the valve. To the rear side of the said plate a stem $r$ is secured which carries a roller $s$ bearing on the bottom face of the valve cone.

In the operation of the apparatus the cattle rocks with its mouth the plate $p$ so that the roller $s$ raises the valve cone $n$ from its seat, whereupon the water flows from the valve casing into the trough $u$. The holes $l$ are disposed so far away from the bottom of the box $h$ that mud and other foreign matter are collected at the bottom of the box $h$. If it is desired to clean the box $h$ the cap screw $m$ is unscrewed, whereupon the whole valve and the plate $p$ suspended therefrom can be removed.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. An apparatus for watering cattle, comprising a container, a conduit for supplying water to said container, a tubular valve casing passed through said conduit and through opposite walls thereof and communicating with said container, said casing being formed at one end with a collar bearing on the outer face of the adjacent wall and at its opposite end with screw-threads, a cap-screw screwing on the threaded end of said casing and bearing on the adjacent wall of said conduit for clamping said casing in position, a valve within said casing, and means within said container in position for being operated by the cattle and for opening said valve.

2. An apparatus for watering cattle, comprising a container, a conduit having a supply of water and adapted for communication with said container, a tubular valve casing passed through said conduit and communicating therewith through lateral holes, said valve casing being formed at the side of the container with a shoulder bearing on the wall of said conduit and at its opposite side carrying a cap for fixing the same in position within the conduit, a valve within said casing, and a plate hinged on said valve casing and disposed within said container in position for being operated by the cattle and for opening said valve.

3. An apparatus for watering cattle, comprising a container, a conduit having a supply of water and adapted for communication with said container, a tubular valve casing passed through said conduit and communicating therewith through lateral holes, said valve casing being formed at the side of the container with a shoulder bearing on the wall of said conduit and at its opposite side carrying a cap for fixing the same in position within the conduit, a valve within said casing, a plate hinged on said valve casing and disposed within said container in position for being operated by the cattle and for opening said valve, the distance between said valve casing and the bottom of said container and the length of said valve casing being such that the valve casing and the plate carried thereby can be removed through said container.

In testimony whereof I hereunto affix my signature.

KARL DICKOW.